Sept. 25, 1962

I. J. SCHUMAIER

DYNAMO ELECTRIC MACHINES

Re. 25,244

Original Filed Dec. 14, 1955

5 Sheets-Sheet 1

INVENTOR
IRWIN SCHUMAIER

BY Ray Eilers ATT'Y.

DYNAMO ELECTRIC MACHINES

Original Filed Dec. 14, 1955

INVENTOR
IRWIN SCHUMAIER

BY Ray Eilers ATT'Y.

DYNAMO ELECTRIC MACHINES

Original Filed Dec. 14, 1955 5 Sheets-Sheet 3

INVENTOR
IRWIN SCHUMAIER

BY Ray Eilers ATT'Y.

Sept. 25, 1962

I. J. SCHUMAIER

DYNAMO ELECTRIC MACHINES

Re. 25,244

Original Filed Dec. 14, 1955

5 Sheets-Sheet 4

INVENTOR
IRWIN SCHUMAIER

BY Ray Eilers ATT'Y.

INVENTOR
IRWIN SCHUMAIER

BY Ray Eilers ATT'Y.

United States Patent Office

Re. 25,244
Reissued Sept. 25, 1962

25,244

DYNAMO ELECTRIC MACHINES

Irwin J. Schumaier, Webster Groves, Mo., assignor to Century Electric Company, St. Louis, Mo., a corporation of Missouri Original No. 2,783,403, dated Feb. 26, 1957, Ser. No. 552,995, Dec. 14, 1955. Application for reissue July 6, 1959, Ser. No. 825,383

20 Claims. (Cl. 310—202)

Matter enclosed in heavy brackets [ ] appears in the original patent but forms no part of this reissue specification; matter printed in italics indicates the additions made by reissue.

This invention relates to improvements in dynamoelectric machines. More particularly this invention relates to improvements in polyphase dynamoelectric machines.

It is therefore an object of the present invention to provide an improved polyphase dynamoelectric machine.

In the construction of polyphase dynamoelectric machines, it is desirable to provide windings, for the various phases of those machines, that have substantially similar distribution of the turns thereof throughout the cores of those machines. Further it is desirable to form those windings so that turns thereof are distributed substantially uniformly throughout those cores. Such windings are physically symmetrical and electrically balanced; and they enable the dynamoelectric machines, in which they are installed, to be unusually quiet and smooth-running in operation.

The turns of each of the windings of polyphase dynamoelectric machines are customarily grouped together to form a number of elongated, generally rectangular coils; and the elongated sides of those coils are disposed in coil slots at the peripheries of the cores of those dynamoelectric machines. If the total number of coil slots at the periphery of the core of a dynamoelectric machine could be just equal to twice the total number of coils of the windings of that machine, it would be a simple matter to provide substantially similar distribution of the coils of the windings throughout the core of that machine and to provide substantially uniform distribution of those coils throughout that core; because each elongated side of each coil could be placed in a separate coil slot. However, in many dynamoelectric machines, as for example lap wound and pyramidal-lap wound dynamoelectric machines, the total number of coil slots must be less than twice the total number of coils of the windings of those machines; and the elongated sides of more than one coil must share the same coil slot. Where the elongated sides of more than one coil must share the same coil slot, one of those elongated sides is disposed in the bottom of the coil slot and the other of those elongated sides is set in the top of that coil slot. Although the two elongated sides are in the same coil slot and are pressed tightly against each other, the two elongated sides will not be subjected to the same magnetic forces; because the magnetic reluctance of the paths through the bottom of a given coil slot is different from the magnetic reluctance of the paths through the top of that coil slot. Further, if that coil slot is in the rotor of the dynamoelectric machine the elongated coil side in the top of that coil slot is subjected to greater centrifugal forces than is the elongated coil side in the bottom of that coil slot. The difference between the magnetic and mechanical forces on the elongated side of one coil disposed in the top of a given coil slot and the magnetic and mechanical forces on the elongated side of a second coil disposed in the bottom of that coil slot is not too great; but that difference can add to corresponding differences in the forces exerted on the elongated sides of other coils disposed in other coil slots to aggregate sizable forces. Consequently, real care must be used in the construction of lap wound and pyramidal-lap wound dynamoelectric machines to balance out these differences in forces.

Lap wound dynamoelectric machines can be, and have been, provided with windings that are physically symmetrical and electrically balanced; as by providing the same number of coils for each winding by placing the same number of elongated coil sides of each winding in the tops of coil slots, by placing the same number of elongated sides of each winding in the bottoms of coil slots, and by distributing the coils of each winding uniformly around the peripheries of the cores. Traditionally, in the installation of lap windings for polyphase dynamoelectric machines, the first elongated side of one of the coils of one of the windings is disposed in the bottom of one of the coil slots; the other elongated side of that coil being temporarily laid loosely against a rearwardly disposed coil slot that it will subsequently occupy. That other side cannot be seated in that rearwardly disposed coil slot at this moment because it is to occupy the top rather than the bottom of that coil slot; and the bottom of that coil slot has not yet been filled. The first elongated side of a second coil is disposed in the bottom of the coil slot immediately beyond the first said coil slot; and the other elongated side of that second coil is temporarily laid loosely against the coil slot immediately ahead of the said rearwardly disposed coil slot. As before, the other elongated side cannot be seated in its intended coil slot because the bottom of that coil slot has not yet been filled. The first elongated sides of additional coils are disposed in the bottoms of progressively advanced coil slots, and the other elongated sides of those additional coils are temporarily laid loosely against their intended coil slots. When the number of coils, having their first elongated sides disposed in the bottoms of coil slots and having their other elongated sides temporarily laid loosely against their intended coil slots, equals the number of coil slots spanned by each of those coils, the next succeeding coil will have its first elongated side disposed in the bottom of the next advanced coil slot and can have its other elongated side disposed in the top of its intended coil slot. This can be done because the bottom of that intended slot was previously filled by the first elongated side of a previously installed coil. Subsequent coils will be installed in this manner until the coil slot intended for the other elongated side of the first coil is reached. Thereafter, the other elongated sides of the first few coils must be moved away from their intended slots to permit the first elongated sides of the remaining coils to be disposed in the bottoms of those intended coil slots. As the other elongated side of each of the first few coils is moved away from its intended coil slot, the first elongated side of the coil for that intended coil slot will be disposed in the bottom of that coil slot and the other elongated side of each of the first few coils will then be disposed in the top of that coil slot. In this way, the first elongated side of each coil is in the bottom of one coil slot while the other elongated side of that coil is in the top of another coil slot.

Where such a procedure is followed in installing the windings of a lap wound polyphase dynamoelectric machine, each of the windings of that machine can have the same number of turns in the tops of coil slots as any other winding, and each of the windings can have the same number of turns in the bottoms of coil slots as any other winding. Further, the turns of each winding can be distributed substantially uniformly throughout the core. As a result, polyphase dynamoelectric machines that are made in this way can have windings that are physically symmetrical and are electrically balanced.

Lap windings for polyphase dynamoelectric machines can be installed rather readily according to the procedure outlined above, if those windings can be installed by hand. However, time factors and cost factors frequently make the hand installation of the windings of dynamoelectric machines impractical. In recognition of this fact, efforts have been made to form and install lap windings and pyramidal-lap windings by coil-winding machines. For brevity, the phrase "lap winding" will, unless the context indicates otherwise, be used hereinafter to denote pyramidal-lap windings as well as the usual and customary lap windings. While operative lap windings have been formed and installed by coil-winding machines, those windings have not been physically symmetrical and they have not been electrically balanced. In some dynamoelectric machines, where the coils have been formed and installed by coil-winding machines, certain of the windings for one of the phases have had more elongated coil sides in the tops of coil slots than the windings for the other phases have had; and the windings for the other phases have had more elongated coil sides in the bottoms of the coil slots than those certain windings have had. The resulting lack of physical symmetry and of electrical balance of those various windings impaired the commercial value of the dynamoelectric machines in which those windings were installed. The present invention avoids any such impairment by providing a polyphase dynamoelectric machine which has a lap winding that is physically symmetrical and electrically balanced and that can be wound and installed by a coil-winding machine. It is therefore an object of the present invention to provide a polyphase dynamoelectric machine which has a lap winding that is physically symmetrical and electrically balanced and which can be wound and installed by a coil-winding machine.

The present invention assures physical symmetry for the various windings of lap wound polyphase dynamoelectric machines, while making it possible to wind and install those windings with coil-winding machines, by forming those windings in sections and by disposing substantially all of the turns of any one section at the same radial distance from the geometric centers of the cores of those machines, and by having substantially the same number of turns of each winding in the tops of coil slots and the same number of turns of each winding in the bottoms of coil slots. The present invention assures electrical balance for the windings of lap wound polyphase dynamoelectric machines by distributing the various sections of the windings uniformly around the peripheries of the cores of those machines. It is therefore an object of the present invention to form the lap windings of polyphase dynamoelectric machines in sections, to dispose substantially all turns of any section at the same radial distance from the geometric centers of the cores of those machines, to have substantially the same number of turns of each winding in the tops of the coil slots of the cores and to have substantially the same number of turns of each winding in the bottoms of the coil slots in those cores, and to distribute the sections of the windings uniformly around the peripheries of those cores.

The sub-dividing of the various windings into a plurality of sections is helpful because it facilitates the distribution of the turns of any winding around the periphery of the core, and it enables the coil-winding machine to wind one section at a time. The disposition of most of the turns of any one section at the same radial distance from the geometric axis of the core is helpful in eliminating the need of lifting the other elongated sides of coils during the installation of the first elongated sides of further coils. Further, that disposition of the turns of the various sections makes it possible for substantially all of the bottoms of the coil slots to be filled before an appreciable number of the tops of the coil slots are filled.

By disposing substantially all of the elongated sides of any section of a pyramidal-lap winding at the same radial distance from the geometric center of the core, the present invention minimizes the number of coils crossing each other in the end turns. This is desirable because it simplifies the insertion of insulating sheets between the coils of adjacent phase windings, it reduces the cumulative bulk of the coil end turns, and it reduces the danger of electrical breakdowns between the various phase windings.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

Figure 1:
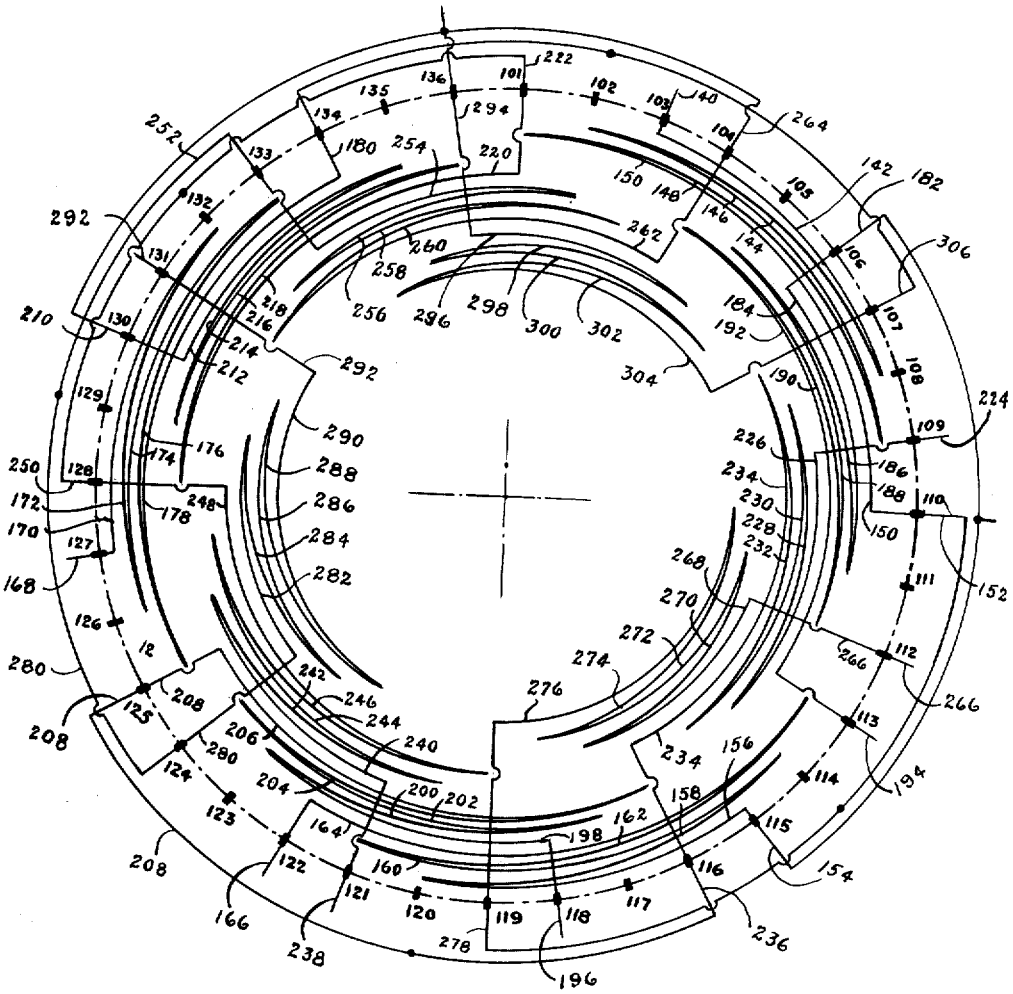
FIG. 1 is a circular diagram showing the distribution, throughout the core, of the turns of the various windings of a dual voltage, pyramidal-lap wound polyphase dynamoelectric machine.

Referring to the drawing in detail, the numerals 101 through 136 denote thirty six radial lines corresponding to the thirty six coil slots at the periphery of the core of a three phase, four pole dynamoelectric machine. In the preferred embodiment shown in FIG. 1, the core is the stator of the dynamoelectric machine; but the windings of FIG. 1 could be mounted on the rotor of that machine.

Figure 2:
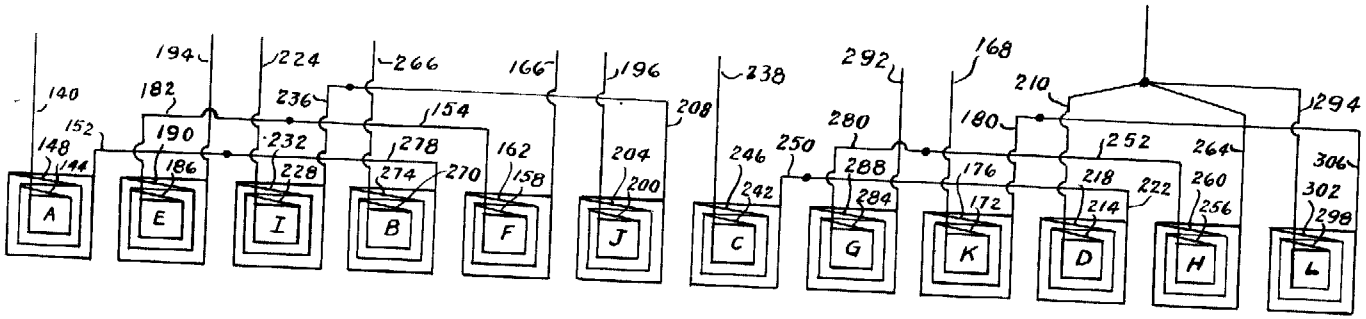
FIG. 2 is a schematic diagram of the windings of the dynamoelectric machine of FIG. 1, and it shows the turns of those windings grouped into coils, and also shows those coils grouped into sections.

In FIG. 1 a number of arcuate lines are provided; and those lines represent the end turns of, and the crossovers for, one end of the coils of the windings of the dynamoelectric machine. The elongated sides and the opposite ends of those coils are not shown in FIG. 1; but they are shown in FIG. 2. The ends of the coils in FIG. 1, and the ends and elongated sides of the coils in FIG. 2 are denoted by single lines, but those ends and sides will include many turns of wire.

The numeral 140 denotes one end of a wire that is used in forming the first of four sections of the first of the three phase windings of the dynamoelectric machine of FIGS. 1--4. That first section is denoted by the letter A in FIG. 2; and the rest of the sections of the first phase winding are denoted by the letters B through D. The four sections of the second phase winding are denoted by the letters E through H and the four sections of the third phase winding are denoted by the letters I through L. Starting from the end 140, the wire extends into coil slot 103, extends rearwardly through the bottom of that coil slot to form one elongated side of a turn, extends across the space between the rear ends of coil slots 103 and 108 to form the rear end of that turn, extends forwardly through the bottom of coil slot 108 to form the other elongated side of that turn, extends across the space between front ends of coil slots 103 and 108 to form the front end 142 of that turn, The wire continues through the bottoms, and between the rear and front ends, of coil slots 103 and 108 to form the required number of turns for the smallest span coil of section A of the first phase winding.

When the wire has formed the requisite number of turns for the smallest span coil, it crosses over, as by the crossover 144, to coil slot 102. The wire then passes rearwardly through the bottom of coil slot 102, passes between the rear ends of slots 102 and 109, passes forwardly through the bottom of slot 109, and then passes between the front ends of the coil slots 102 and 109. In doing so, the wire forms the elongated sides, the rear end, and the front end 146 of one turn of the intermediate span coil of section A of the first phase winding. The wire continues to pass through the bottoms, and between the rear and front ends, of coil slots 102 and 109 until the requisite number of turns for the intermediate span coil of section A of the first phase winding has been formed.

The wire then crosses over, as by the crossover 148, to coil slot 101, The wire extends rearwardly through the bottom of coil slot 101, extends between the rear ends of coil slots 101 and 110, extends forwardly through the bottom of coil slot 110, and then extends between the front ends of coil slots 101 and 110 to define the elongated sides, the rear end and the front end 150 of one turn of the largest span coil of section A of the first phase winding. Additional turns will be formed from the wire; and when the requisite number of turns has been formed within the bottoms of coil slots 101 and 110, the other end 152 of that wire is led out of coil slot 110 and cut.

During the winding operations, the core of the dynamoelectric machine is preferably set so the bottoms of the coil slots being filled are down.

This enables the force of gravity to help hold the turns of wire in the slots until the coils are completely wound. In accordance with this plan, the core of FIG. 1 will be set with coil slots 105 and 106 at the bottom of the core when the three coils of section A of the first phase winding are wound.

After the end 152 has been cut, the core is rotated approximately one hundred and twenty degrees in the counter clockwise direction in FIG. 1. That rotation will place coil slots 117 and 118 at the bottom of the core. An end 154 of wire is set adjacent coil slot 115; and that wire is directed into that coil slot. That wire will extend rearwardly through the bottom of that coil slot, will extend between the rear ends of coil slots 115 and 120, will extend forwardly through the bottom of coil slot 120, and will extend between the front ends of coil slots 115 and 120 to form the elongated sides, rear end and front end 156 of one turn of a coil. Additional turns will be formed in the bottoms, and between the rear and front ends, of coil slots 115 and 120 until the smallest span coil of section F of the second phase winding is completed.

The wire then crosses over, as by the crossover 158, to coil slot 114. The wire will then be wound repeatedly into the bottoms, and between the rear and front ends, of coil slots 114 and 121. The front end of the resulting intermediate span coil of section F is denoted by the numeral 160. Upon completion of the intermediate span coil of section F, the wire will be crossed over, as by crossover 162, to coil slot 113. The wire will then be wound repeatedly into the bottoms, and between the front and rear ends, of coil slots 113 and 122 until the elongated sides, rear end and front end 164 of the largest span coil of section F are completed. At that time the free end 166 of the wire is led out of coil slot 122 and cut.

The core is then rotated approximately one hundred and twenty degrees in the counter clockwise direction in FIG. 1 until coil slots 129 and 130 are at the bottom of the core. An end 168 of wire is set adjacent the coil slot 127, and that wire is directed into and rearwardly through the bottom of that coil slot. That wire is then wound repeatedly through the bottoms, and between the front and rear ends, of coils slots 127 and 132 to form the smallest span coil of section K of the third phase winding. The front end of that coil is denoted by the numeral 170.

Upon completion of the smallest span coil of section K, the wire is crossed over, as by crossover 172, to coil slot 126. The wire is then repeatedly wound rearwardly through the bottom of coil slot 126, between the rear ends of coil slots 126 and 133, forwardly through the bottom of coil slot 133, and between the front ends of coil slots 126 and 133 to form the intermediate span coil of section K. The front end of that coil is denoted by the numeral 174. The wire is then crossed over, as by crossover 176, to coil slot 125. The wire is repeatedly extended rearwardly through the bottom of coil slot 125, between the rear ends of coil slots 125 and 134, forwardly through the bottom of coil slot 134, and between the front ends of coil slots 125 and 134 to form the largest span coil of section K. The front of that coil is denoted by the numeral 178. When the requisite number of turns for the largest span coil of section K of the third phase winding have been wound, the free end 180 of the wire is led out of coil slot 134 and cut.

At this time, one section of each of the three phase windings has been formed. Each of those sections has three coils; and the elongated sides of each coil are located the same radial distance from the geometric center of the core. Specifically, the elongated sides of all of the coils of sections A, F and K are disposed in the bottoms of the coil slots. Moreover, the sections A, F and K are spaced one hundred and twenty degrees apart; and hence those sections are physically symmetrical.

The core will then be rotated approximately one hundred and fifty degrees in the counter clockwise direction in FIG. 1 to place coil slots 108 and 109 at the bottom of the core. At this time the core will be displaced thirty degrees from its initial position. The end 182 of a wire is set adjacent the coil slot 106; and the wire is repeately directed rearwardly through the bottom of that coil slot, between the rear ends of coil slots 106 and 111, forwardly through the bottom of coil slot 111, and between the front ends of coil slots 106 and 111 to form the smallest span coil of section E of the second phase winding. The front end of that coil is denoted by the numeral 184.

Once the smallest span coil of section E has been formed, the wire is crossed over, by crossover 186, to coil slot 105. That wire will then be wound repeatedly through the bottoms, and between the front and rear ends, of coil slots 105 and 112 to form the intermediate span coil of section E. The front end of that coil is denoted by the numeral 188. Upon the completion of the intermediate coil of section E, the wire is crossed over, by crossover 190, to coil slot 104. That wire will repeatedly extend rearwardly through the bottom of coil slot 104, between the rear ends of coil slots 104 and 113, forwardly through the top of coil slot 113, and between the front ends of coil slots 104 and 113 to define the largest span coil of section E. The front end of that coil is denoted by the numeral 192. The wire cannot extend into the bottom of coil slot 113, because that bottom was filled during the winding of the largest span coil of section F of the second phase winding. The free end 194 of the wire extends outwardly from coil slot 113 and is cut.

When section E is complete, the core is rotated one hundred and twenty degrees in the counter clockwise direction in FIG. 1 to dispose coil slots 120 and 121 at the bottom of that core. The end 196 of a wire will be placed adjacent the coil slot 118, and that wire will be directed into and rearwardly through the bottom of coil slot 118. That wire will then be repeatedly wound between the rear ends of coil slots 118 and 123, forwardly through the bottom of coil slot 123, and between the front ends of coil slots 118 and 123 to form the smallest span coil of section J of the third phase winding. The front end of that wire is denoted by the numeral 198.

A crossover 200 extends from coil slot 123 to coil slot 117; and the wire will extend rearwardly through the bottom of coil slot 117. That wire will then repeatedly extend between the rear ends of coil slots 117 and 124, forwardly through the bottom of coil slot 124, and across the front of the core to coil slot 117. In this way, the intermediate span coil of section J will be formed, and the front end of that coil is denoted by the numeral 202.

Crossover 204 extends from coil slot 124 to coil slot 116; and the wire will extend rearwardly through the bottom of that coil slot. The wire will repeatedly extend between the rear ends of coil slots 116 and 125, forwardly through the top of coil slot 125 and between the front ends of 116 and 125 to form the largest span coil of section J. The front of that coil is denoted by the numeral 206, and it extends between the top of coil slot 125 and the bottom of coil slot 116. The bottom of coil slot 125 was filled when the largest span coil of section J was wound; and hence the other elongated side of the largest span coil of section J will seat in the top of coil slot 125. The free end of the wire will project from the coil slot 125; and that free end is denoted by the numeral 208.

The core is then rotated one hundred and twenty degrees in the counterclockwise direction in FIG. 1 to place coil slots 132 and 133 at the bottom of the core. A free end 210 of wire will be set adjacent the coil slot 130, and that wire will be directed into and extended rearwardly through the bottom of coil slot 130. That wire will repeatedly extend between the rear ends of coil slots 130 and 135, forwardly through the bottom of coil slot 135, and between the front ends of coil slots 130 and 135 to form the smallest span coil of section D of the first phase winding. The front end of that coil is denoted by the numeral 212.

A cross over 214 extends between coil slot 135 and coil slot 129; and the wire will extend rearwardly through the bottom of coil slot 129. The wire repeatedly extends across the rear of the core to coil slot 136, forwardly through the bottom of that coil slot, and then across the front of the core to coil slot 129 to form the intermediate span coil of section D. The front end of that coil is denoted by the numeral 216.

A crossover 218 extends from the coil slot 136 to the coil slot 128; and the wire extends rearwardly through the bottom of coil slot 128. That wire repeatedly extends across the rear of the core to the coil slot 101, forwardly through the top of coil slot 101, and then across the front of the core to the coil slot 128 to form the largest span coil of section D. The front end of the coil is denoted by numeral 220. The wire cannot seat in the bottom of coil slot 101 because that bottom was filled by the first elongated side of the largest span coil of section A of the first phase winding. The free end 222 of the wire extends outwardly from the coil slot 101 and is cut.

At this time, one half of the total number of sections of the three phase windings have been installed; and the arrangement and disposition of those windings are similar. Thus, each of the phase windings has two sections with eleven elongated sides in the bottoms of coil slots and one elongated side in the top of a coil slot. Furthermore, one elongated side of each of the two sections of each of the phase windings share one coil slot between them; and hence the two sections of each winding subtend one hundred and eighty degrees of the periphery of the core. Also, at this time thirty three of the available thirty six bottoms have been filled, and three of the thirty six available tops have been filled.

The core is then rotated one hundred and fifty degrees in the counter clockwise direction in FIG. 1 to place coil slots 111 and 112 at the bottom of the core. At this time the core is sixty degrees from its initial position. The end 224 of a wire is set adjacent coil slot 109, and that wire is repeatedly extended rearwardly through the top of that coil slot. The wire repeatedly extends between the rear ends of the coil slots 109 and 114, forwardly through the top of coil slot 114, and then across the front of the core to coil slot 109. The front end of the resulting coil is denoted by the numeral 226; and that coil is the smallest span coil of section I of the third phase winding.

Coil slot 109 had the bottom thereof filled when the intermediate span coil of section A of the first phase winding was wound and installed. Coil slot 114 had the bottom thereof filled when the intermediate coil of section F of the second phase winding was wound and installed. Consequently, the turns of the smallest span coil of section I cannot seat in the bottoms of coil slots 109 and 114; instead they will seat in the tops of those coil slots.

Crossover 228 extends from coil slot 114 to coil slot 108; and the wire will then repeatedly extend rearwardly through the top of coil slot 108. That wire will repeatedly extend between the rear ends of coil slots 108 and 115, forwardly through the top of coil slot 115, and between the front ends of coil slots 108 and 115. The front end of the resulting coil is denoted by the numeral 230; and that coil will be the intermediate span coil of section I.

Crossover 232 extends from coil slot 115 to coil slot 107; and the wire will then repeatedly pass rearwardly through the bottom of coil slot 107, between the rear ends of coil slots 107 and 116, forwardly through the top of coil slot 116, and between the front ends of coil slots 107 and 116. The front of the resulting coil, which is the largest span coil of section I, is denoted by the numeral 234. The free end 236 of the wire extends outwardly from the coil slot 116 and is cut.

The core is then rotated one hundred and twenty degrees in the counter clockwise direction in FIG. 1 to place coil slots 123 and 124 at the bottom of the core. An end 238 is set adjacent coil slot 121; and that wire is repeatedly passed rearwardly through the top of coil slot 121, between the rear ends of coil slots 121 and 126, forwardly through the top of coil slot 126, and between the front ends of coil slots 126 and 121. The front end of the resulting smallest span coil of section C of the first phase winding is denoted by the numeral 240. The bottom of coil slot 121 was filled when the intermediate span coil of section F of the second phase winding was formed; and the bottom of coil slot 126 was filled when the intermediate span coil of section K of the third phase winding was formed. Hence the elongated sides of the smallest span coil of section C of the first phase winding will seat in the tops of coil slots 121 and 126.

A crossover 242 extends between coil slots 126 and 120; and the wire will repeatedly pass rearwardly through the top of coil slot 120, between the rear ends of coil slots 120 and 127, forwardly through the top of coil slot 127, and between the front ends of coil slots 120 and 127. The front end of the resulting intermediate span coil of section C is denoted by the numeral 244. Crossover 246 extends between coil slots 127 and 119; and the wire will repeatedly pass rearwardly through the bottom of coil slot 119, between the rear ends of coil slots 119 and 128, forwardly through the top of coil slot 128, and between the front ends of coil slots 119 and 128. The front end of the resulting largest span coil of section C is denoted by the numeral 248. The free end 250 of the wire extends outwardly from coil slot 128 and is cut.

The core is then rotated one hundred and twenty degrees in the counter clockwise direction in FIG. 1 to place coil slots 135 and 136 at the bottom of that core. An end 252 is set adjacent coil slot 133; and that wire is repeatedly passed rearwardly through the top of coil slot 133, between the rear ends of coil slots 133 and 102, forwardly through the top of coil slot 102, and between the front ends of coil slots 133 and 102. The front end of the resulting smallest span coil of section H of the third phase winding is denoted by the numeral 254.

A crossover 256 extends between coil slots 102 and 132; and the wire will repeatedly pass rearwardly through the top of coil slot 132, between the rear ends of coil slots 132 and 103, forwardly through the top of coil slot 103, and between the front ends of coil slots 103 and 132. The front end of the resulting intermediate span coil of section H is denoted by the numeral 258. Crossover 260 extends between coil slots 103 and 131; and the wire will repeatedly pass rearwardly through the bottom of coil slot 131, between the rear ends of coil slots 131 and 104, forwardly through the top of coil slot 104, and between the front ends of coil slots 104 and 131. The front end of the resulting largest span coil of section H is denoted by the numeral 262. The free end 264 of the wire extends outwardly from coil slot 104 and is cut.

At this time three quarters of the total number of sections of the three phase windings have been installed; and the arrangement and disposition of those windings are similar. Thus, each of the phase windings has three sections with twelve elongated sides in the bottoms of coil slots and with six elongated sides in the tops of coil slots. Furthermore, the three sections of each winding coact to subtend two hundred and seventy degrees of the periphery of the core. Also, at this time, all of the thirty six available bottoms are filled and eighteen of the available thirty six tops have been filled.

The core is then rotated one hundred and fifty degrees in the counter clockwise direction in FIG. 1 to place the coil slots 114 and 115 at the bottom of the core. At this time the core will be ninety degrees from its initial position. An end 266 of wire is set adjacent coil slot 112; and that wire repeatedly passes rearwardly through the top of coil slot 112, between the rear ends of coil slots 112 and 117, forwardly through the top of coil slot 117, and between the front ends of coil slots 117 and 112. The front end of the resulting smallest span coil of section B of the first phase winding is denoted by the numeral 268.

Crossover 270 extends between coil slot 117 and coil slot 111; and the wire repeatedly passes rearwardly through the top of coil slot 111, between the rear ends of coil slots 111 and 118, forwardly through the top of coil slot 118, and between the front ends of coils 118 and 111. The front end of the resulting intermediate span coil of section B is denoted by the numeral 272. Crossover 274 extends between coil slot 118 and coil slot 110; and the wire repeatedly passes rearwardly through the top of coil slot 110; between the rear ends of coil slots 110 and 119, forwardly through the top of coil slot 119, and between the front ends of coil slots 119 and 110. The front of the resulting largest span coil of section B is denoted by the numeral 276. The free end 278 of the wire extends outwardly from the coil slot 119 and is cut.

The core is then rotated one hundred and twenty degrees in the counter clockwise direction in FIG. 1 to place coil slots 126 and 127 at the bottom of the core. An end 280 is set adjacent coil slot 124; and that wire is repeatedly passed rearwardly through the top of coil slot 124, between the rear ends of coil slots 124 and 129, forwardly through the top of coil slot 129, and between the front ends of coil slots 129 and 124. The front end of the resulting smallest span coil of section G of the second phase winding is denoted by the numeral 282.

A crossover 284 extends between coil slots 129 and 123; and the wire is repeatedly passed rearwardly through the top of coil slot 123, between the rear ends of coil slots 123 and 130, forwardly through the top of coil slot 130, and between the front ends of coil slots 130 and 123. The front end of the resulting intermediate span coil of section G is denoted by the numeral 286. Crossover 288 extends between coil slot 130 and coil slot 122; and the wire is repeatedly passed rearwardly through the top of coil slot 122, between the rear ends of coil slots 122 and 131, forwardly through the top of coil slot 131, and between the front ends of coil slots 131 and 122. The front end of the resulting largest span coil of section G is denoted by the numeral 290. The free end 292 of the wire extends outwardly from the coil slot 131 and is cut.

Thereupon the core is rotated one hundred and twenty degrees to place the coil slots 102 and 103 at the bottom of the core. An end 294 of wire is set adjacent the coil slot 136; and that wire is repeatedly passed rearwardly through the top of coil slot 136, between the rear ends of coil slots 136 and 105, forwardly through the top of coil slot 105, and between the front ends of coil slots 105 and 136. The front end of the resulting smallest span coil of section L of the third phase winding is denoted by the numeral 296.

A cross over 298 extends between coil slots 105 and 135; and the wire is repeatedly passed rearwardly through the top of coil slot 135, between the rear ends of coil slots 135 and 106, forwardly through the top of coil slot 106, and between the front ends of coil slots 106 and 135. The front end of the resulting intermediate span coil of section L is denoted by the numeral 300. Crossover 302 extends between coil slot 106 and coil slot 134; and the wire is repeatedly passed rearwardly through the top of coil slot 134, between the rear ends of coil slots 134 and 107, forwardly through the top of coil slot 107, and between the front ends of coil slots 107 and 134. The front end of the resulting largest span coil of section L is denoted by the numeral 304. The free end 306 of the wire projects from the coil slot 107 and is cut.

At this time, all of the sections of all of the three phase windings are complete; and the arrangement and disposition of those windings are similar. Thus, each of the phase windings has four sections with twelve elongated sides in the bottoms of coil slots and twelve elongated sides in the tops of coil slots. Furthermore, the four sections of each of the phase windings are uniformly distributed around the periphery of the core.

The various sections of the three phase windings can be connected together in different ways, as desired. In FIG. 2, the ends 210, 264 and 294 of sections D, H and L are connected together to provide the center connection of a star winding. The free end 222 of section D is suitably connected to the free end 250 of section C; the free end 252 of section H is suitably connected to the free end 280 of section G; and the free end 306 of section L is suitably connected to the free end 180 of section K. The connections will preferably be made with solder. This interconnection of sections C, D, G, H, K and L enables sections C, H and K to generate poles of one polarity and enables sections D, G and L to generate poles of the opposite polarity.

The end 152 of section A is suitably connected to the end 278 of section B; the end 182 of section E is suitably connected to the end 154 of section F; and the end 236 of section I is suitably connected to the end 208 of section J. Again, the connections will preferably be made with solder. This interconnection of sections A, B, E, F, I and J enables sections A, F and I to generate poles of a polarity opposite to the polarity of the poles generated by sections B, E and J.

Figure 3:
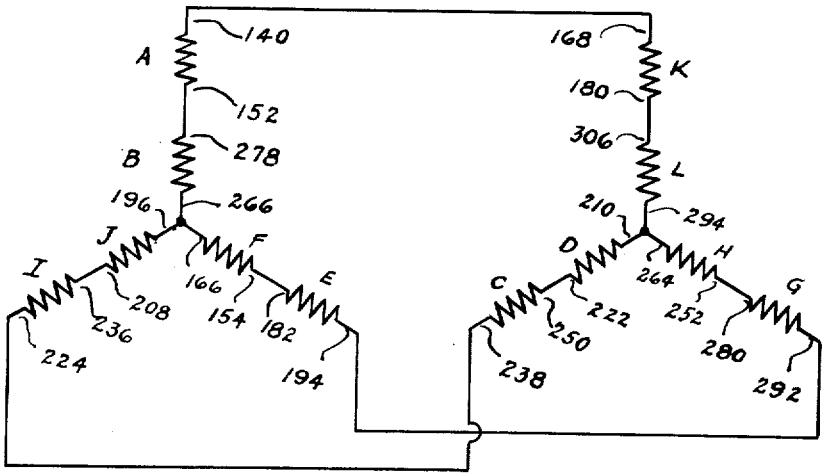
FIG. 3 is a diagrammatic showing of the manner of connecting the windings of FIGS. 1 and 2 to provide low voltage operation.

If low voltage operation is desired, the free ends 166, 196 and 266 can be suitably connected to form the center of a second star winding, the free ends 140 and 168 can be suitably connected, the free ends 194 and 292 can be suitably connected, and the free ends 224 and 236 can be suitably connected. This interconnection of the various sections is shown in FIG. 3; and it provides the required alternation of poles needed for four pole operation. Thus, sections A, C, F, H, I and K provide poles of one polarity while sections B, D, E, G, J and L provide poles of opposite polarity.

Figure 4:
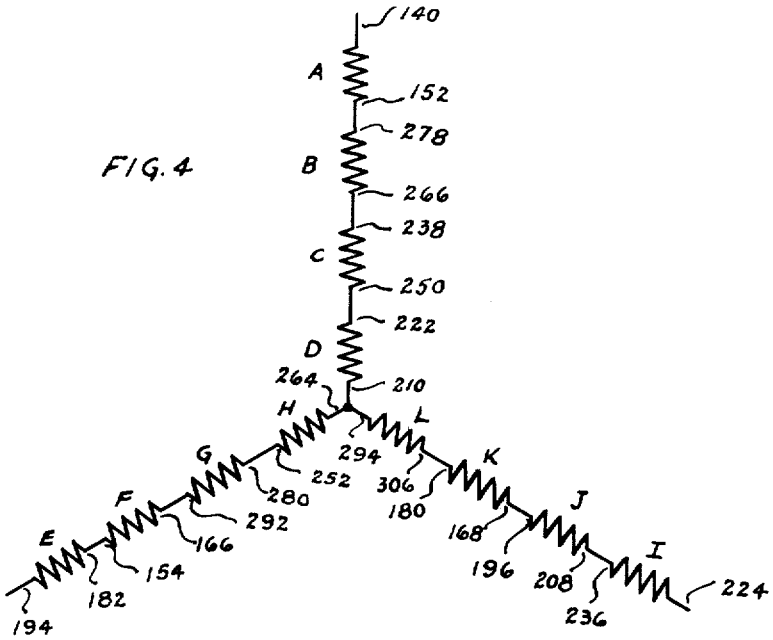
FIG. 4 is a diagrammatic showing of the manner of connecting the windings of FIGS. 1 and 2 to provide high voltage operation.

If high voltage operation is desired, the free end 210 of section D and the free end 264 of section H and the free end 294 of section L are suitably connected together, as by solder, to form the center of a star winding. The free end 238 of section C is suitably connected to the free end 266 of section B, as by solder, to form one leg of the star winding; that leg including the sections D, C, B and A. The free end 292 of section G is suitably connected, as by solder, to the free end 166 of section F to form a second leg of the star winding; that leg including the sections H, G, F and E. The free end 168 of section K is suitably connected, as by solder, to the free end 196 of section J to form the third leg of the star winding; that leg including L, K, J and I. This interconnection of the various sections is shown in FIG. 4; and it provides the required alternation of poles needed for four pole operation. Thus, as in the case of FIG. 3, sections A, C, F, H, I and K provide poles of one polarity while sections B, D, E, G, J and L provide poles of opposite polarity.

Figure 5:
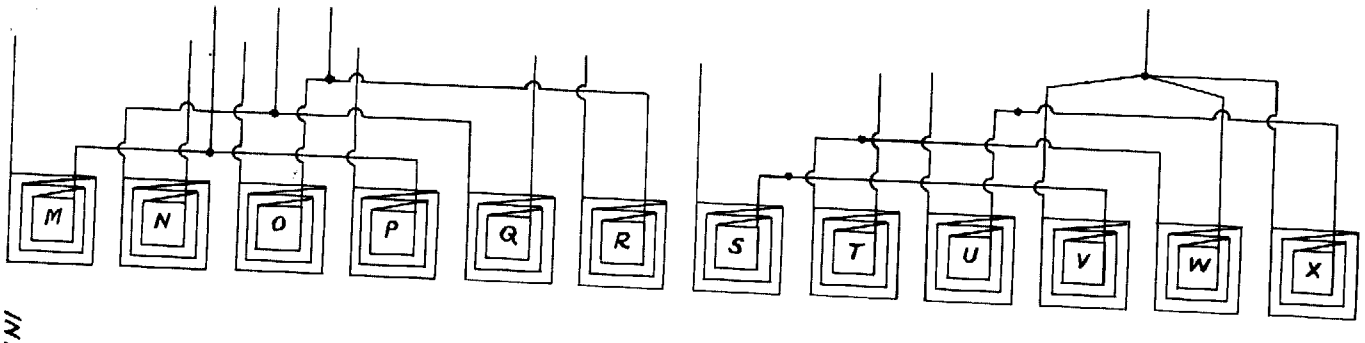
FIG. 5 is a schematic diagram of the windings of a dynamoelectric machine that is identical with the dynamoelectric machine of FIG. 1 except for the fact that the coils have been inverted.

FIG. 5 discloses twelve sections M through X which are largely comparable to the sections A through L of FIGS. 1–4. Thus, section M has the same number of coils that section A has, and those coils are located in the same slots in which the coils of section A are located. The difference between section A and section M is that the wire of section A enters coil slot 103, crosses over from coil slot 108 to coil slot 102, again crosses over from coil slot 109 to coil slot 101 and exits from coil slot 110; while the wire of section M enters coil slot 108, crosses over from coil slot 103 to coil slot 109, again crosses over from coil slot 102 to coil slot 110, and exits from coil slot 101. In effect, section M is merely section A inverted. A similar relation exists between sections B through L and sections N through X.

The sections of FIG. 5 can be connected together in the manner in which the sections of FIGS. 1 and 2 are connected together. Specifically, the sections of FIG. 5 can be connected together to provide either low voltage operation or high voltage operation.

Figure 6:
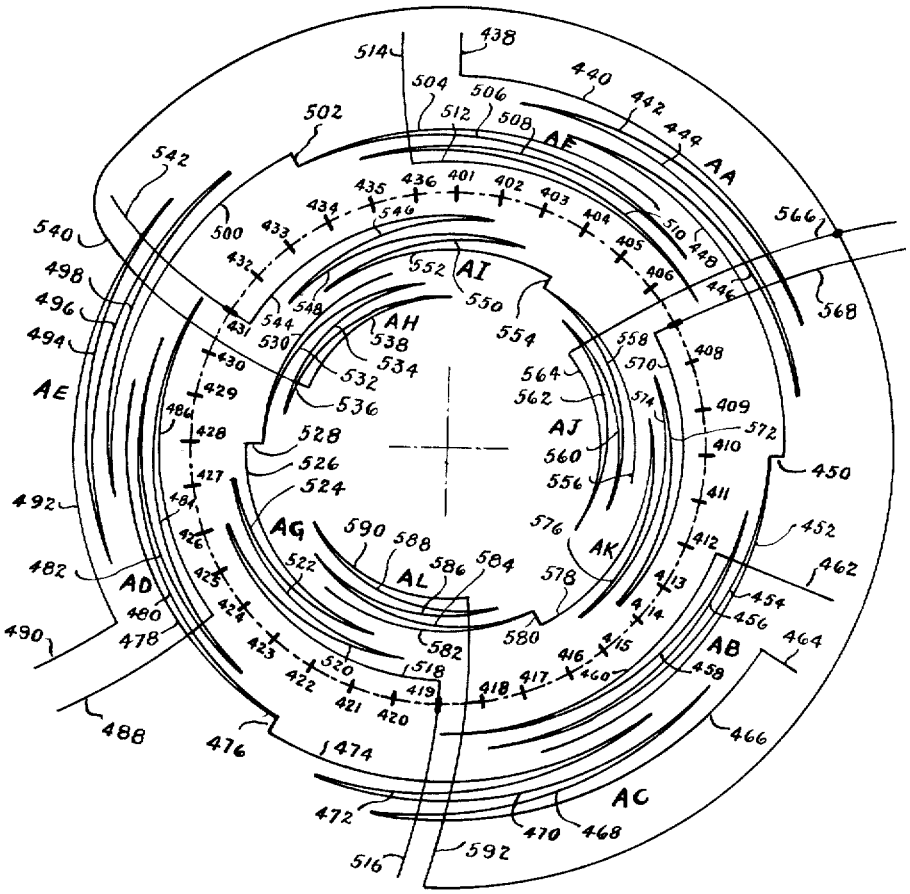
FIG. 6 is a circular diagram showing the distribution, throughout the core, of the turns of the various windings of a dual voltage, lap wound dynamoelectric machine.
Figure 7:
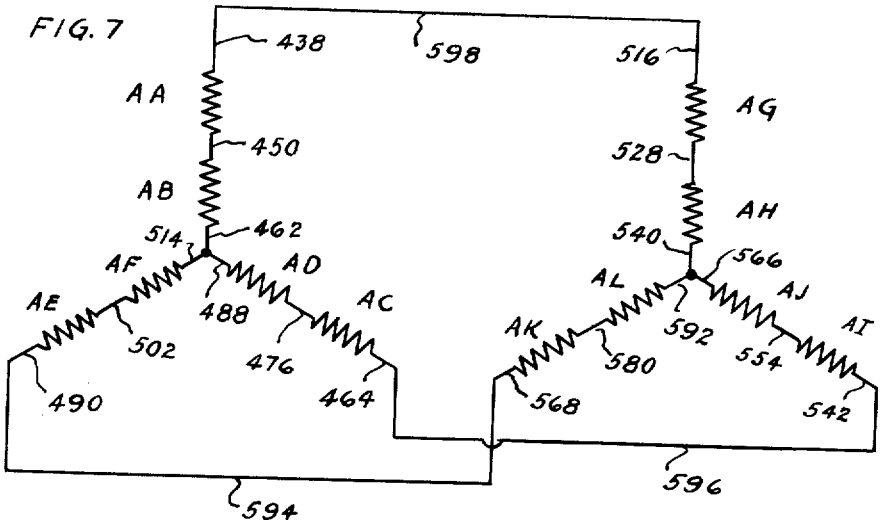
FIG. 7 is a diagrammatic showing of the manner of connecting the windings of FIG. 6 for low voltage operation.
Figure 8:
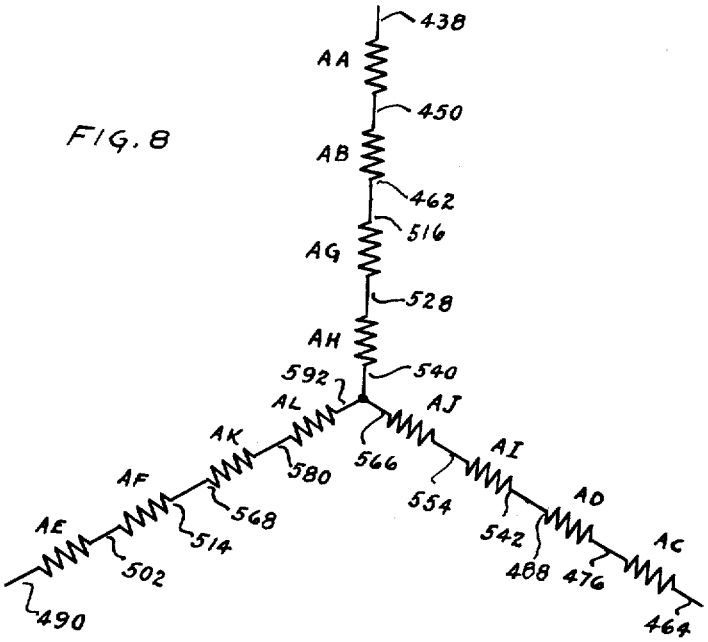
FIG. 8 is a diagrammatic showing of the manner of connecting the windings of FIG. 6 for high voltage operation.

FIGS. 6–8 show a lap winding that provides dual voltage operation. The numerals 401 through 436 denote radial lines corresponding to the thirty-six slots in the core of a polyphase dynamoelectric machine. An end 438 of wire is placed adjacent coil slot 401, and the wire is repeatedly passed rearwardly through the bottom of coil slot 401, between the rear end of coil slots 401 and 408, forwardly through the bottom of coil slot 408, and between the front ends of coil slots 408 and 401. The front end of the first coil of section AA of the first phase winding is denoted by the numeral 440.

A crossover 442 extends from coil slot 408 to coil slot 402; and the wire is repeatedly passed through the bottom of coil slot 402, between the rear ends of coil slots 402 and 409, forwardly through the bottom of coil slot 409, and between the front ends of coil slots 409 and 402. The front end of the second coil of section AA is denoted by the numeral 444. A crossover 446 extends between coil slots 409 and 403; and the wire is repeatedly passed rearwardly through the bottom of coil slot 403, between the rear ends of coil slots 403 and 410, forwardly through the bottom of coil slot 410, and between the coil slots 410 and 403. The front end of this last coil of section AA is denoted by the numeral 448.

The end 450 of the wire extends out of the front end of coil slot 410, passes across the front of the core to coil slot 417, passes rearwardly through the bottom of coil slot 417, passes between the rear ends of coil slots 417 and 410, and then passes forwardly through the top of coil slot 410. The resulting turn will generate a pole that has a polarity opposite to the polarity of the pole generated by section AA. Additional turns of this nature will form the first coil of section AB of the first phase winding. The front end of that coil is denoted by the numeral 452.

Crossover 454 extends between coil slot 410 and coil slot 418; and the wire is repeatedly passed rearwardly through the bottom of coil slot 418, between the rear ends of coil slots 418 and 411, forwardly through the bottom of coil slot 411, and between the front ends of coil slots 411 and 418. The front end of the resulting second coil of section AB is denoted by the numeral 456. Crossover 458 extends from coil slot 411 to coil slot 419; and the wire is repeatedly passed rearwardly through the bottom of coil slot 419, between the rear ends of coil slots 419 and 412, forwardly through the bottom of coil slot 412, and between the front ends of coil slots 412 and 419. The front end of the resulting last coil of section AB is denoted by the numeral 460. The free end 462 of the wire extends outwardly from the coil slot and is cut.

End 464 of a wire is placed adjacent coil slot 413; and the wire is repeatedly passed rearwardly through the bottom of coil slot 413, between the rear ends of coil slots 413 and 420, forwardly through the bottom of coil slot 420, and between the front ends of coil slots 420 and 413. The front end of the resulting first coil of section AC of the second phase winding is denoted by the numeral 466. Crossover 468 extends between coil slots 420 and 414; and the wire is repeatedly passed through the bottom of coil slot 414, between the rear ends of coil slots 414 and 421, forwardly through the bottom of coil slot 421, and between the front ends of coil slots 421 and 414. The front end of the resulting second coil of section AC is denoted by the numeral 470. Crossover 472 extends between coil slots 421 and 415; and the wire is repeatedly passed rearwardly through the bottom of coil slot 415, between the rear ends of coil slots 416 and 422, forwardly through the bottom of coil slot 422, and between the front ends of coil slots 422 and 415. The front end of the resulting last coil of section AC is denoted by the numeral 474.

The end 476 of the wire extends to coil slot 429; and the wire is repeatedly passed rearwardly through the bottom of coil slot 429, between the rear end of coil slots 429 and 422, through the top of coil slot 422, and between the front ends of coil slots 422 and 429. The front end of the resulting first coil of section AD of the second phase winding is denoted by the numeral 478. This first coil of section AD has a polarity opposite to the polarity of the coils of section AC. Crossover 480 extends from coil slot 422 to coil slot 430; and the wire is repeatedly passed rearwardly through the bottom of coil slot 430, between the rear ends of coil slots 430 and 423, forwardly through the bottom of coil slot 423, and between the front ends of coil slots 423 and 430. The front end of the resulting second coil of section AD is denoted by the numeral 482. Crossover 484 extends from coil slot 423 to coil slot 431; and the wire is repeatedly passed rearwardly through the bottom of coil slot 431, between the rear ends of coil slots 431 and 424, forwardly through the bottom of coil slot 424, and between the front ends of coil slots 424 and 431. The front end of the resulting last coil of section AD is denoted by the numeral 486. The free end 488 of the wire extends outwardly from coil slot 424 and is cut.

An end 490 of wire is placed adjacent coil slot 425; and the wire is repeatedly passed rearwardly through the bottom of that slot, between the rear ends of coil slots 425 and 432, forwardly through the bottom of coil slot 432, and between the front ends of coil slots 432 and 425. The front end of the resulting first coil of section AE of the third phase winding is denoted by the numeral 492. Crossover 494 extends between coil slots 432 and 426; and the wire is repeatedly passed through the bottom of coil slot 426, between the rear ends of coil slots 426 and 433, forwardly through the bottom of coil slot 433, and between the front ends of coil slots 433 and 426. The front end of the resulting second coil AE is denoted by the numeral 496. Crossover 498 extends between coil slots 433 and 427; and the wire is repeatedly passed rearwardly through the bottom of coil slot 427, between the rear ends of coil slots 427 and 434, forwardly through the bottom of coil slot 434, and between the front ends of coil slots 434 and 427. The front end of the resulting last coil of section AE is denoted by the numeral 500.

The end 502 of the wire extends outwardly from coil slot 434; and the wire is repeatedly passed between the front ends of coil slots 434 and 405, rearwardly through the bottom of coil slot 405, between the rear ends of coil slots 405 and 434, and forwardly through the top of coil slot 434. The front end of the resulting first coil of section AF of the third phase winding is denoted by the numeral 504. This coil has a polarity opposite to the polarity of the coils of section AE. Crossover 506 extends from coil slot 434 to coil slot 406; and the wire is repeatedly passed rearwardly through the bottom of coil slot 406, between the rear ends of coil slots 406 and 435, forwardly through the bottom of coil slot 435, and between the front ends of coil slots 435 and 406. The front end of the resulting second coil of section AF is denoted by the numeral 508. Crossover 510 extends from coil slot 435 to coil slot 407; and the wire is repeatedly passed rearwardly through the bottom of coil slot 407, between the rear ends of coil slots 407 and 436, forwardly through the bottom of coil slot 436, and between the front ends of coil slots 436 and 407. The front end of the resulting last coil of section AF is denoted by the numeral 512. The free end 514 of the wire extends outwardly from coil slot 436 and is cut.

At this time, one half of the total number of sections of the three phase windings have been formed and installed. The two sections of each winding subtend one hundred and eighty degrees of the periphery of the core, they occupy the bottoms of coil slots with the exception of the coil slot in which the direction of winding was reversed, and they provide the required alternation of poles. The elongated sides of the coils in each section are dominantly spaced the same distance from the geometric center of the core.

An end 516 of wire is set adjacent coil slot 419; and the wire is repeatedly passed rearwardly through the top of that coil slot, between the rear ends of coil slots 419 and 426, forwardly through the top of coil slot 426, and between the front ends of coil slots 426 and 419. The front end of the resulting first coil of section AG of the first phase winding is denoted by the numeral 518. Crossover 520 extends between coil slots 426 and 420; and the wire is repeatedly passed rearwardly through the top of coil slot 420, between the rear ends of coil slots 420 and 427, forwardly through the top of coil slot 427, and between the front ends of coil slots 427 and 420. The front end of the resulting second coil of section AG is denoted by the numeral 522. Crossover 524 extends between coil slots 427 and 421; and the wire is repeatedly passed rearwardly through the top of coil slot 421, between the rear ends of coil slots 421 and 428, forwardly through the bottom of coil slot 428, and between the front ends of coil slots 428 and 421. The front end of the resulting last coil of section AG is denoted by the numeral 526.

The end 528 of the wire projects outwardly from coil slot 428 and extends to coil slot 435; and the wire is repeatedly passed rearwardly through the top of coil slot 435, between the rear ends of coil slots 435 and 428, forwardly through the top of coil slot 428, and between the front ends of coil slots 428 and 435. The front end of the resulting first coil of section AH of the first phase winding is denoted by the numeral 530. Crossover 532 extends between coil slot 428 and coil slot 436; and the wire is repeatedly passed rearwardly through the top of coil slot 436, between the rear ends of coil slots 436 and 429, forwardly through the top of coil slot 429, and between the front ends of coil slots 429 and 436. The front end of the resulting second coil of section AH is denoted by the numeral 534. Crossover 536 extends between coil slots 429 and 401; and the wire is repeatedly passed rearwardly through the top of coil slot 401, between the rear ends of coil slots 401 and 430, forwardly through the top of coil slot 430, and between the front ends of coil slots 430 and 401. The front end of the resulting last coil of section AH is denoted by the numeral 538. The free end 540 of the wire extends outwardly from coil slot 430 and is cut.

An end 542 is set adjacent coil slot 431, and the wire is repeatedly passed rearwardly through the top of coil slot 431, between the rear ends of coil slots 431 and 402, forwardly through the top of coil slot 402, and between the front ends of coil selots 402 and 431. The front of the resulting first coil of section AI of the second phase winding is denoted by the numeral 544. Crossover 546 extends between coil slots 402 and 432; and the wire is repeatedly passed rearwardly through the top of coil slot 432, between the rear ends of coil slots 432 and 403, forwardly through the top of coil slot 403, and between the front ends of coil slots 403 and 432. The front end of the resulting second coil of section AI is denoted by the numeral 548. Crossover 550 extends between coil slots 403 and 433; and the wire is repeatedly passed rearwardly through the top coil slot 433, between the rear ends of coil slots 433 and 404, forwardly through the bottom of coil slot 404, and between the front ends of coil slots 404 and 433. The front end of the resulting last coil of section AI is denoted by the numeral 552.

The end 554 of the wire extends outwardly from coil slot 404 and extends to coil slot 411; and the wire is repeatedly passed rearwardly through the top of coil slot 411, between the rear ends of coil slots 411 and 404, forwardly through the top of coil slot 404, and between the front ends of coil slots 404 and 411. The front end of the resulting first coil of section AJ of the second phase winding is denoted by the numeral 556. Crossover 558 extends between coil slots 404 and 412; and the wire is repeatedly passed rearwardly through the top of coil slot 412, between the rear ends of coil slots 412 and 405, forwardly through the top of coil slot 405, and between the front ends of coil slots 405 and 412. The front end of the resulting second coil of section AJ is denoted by the numeral 560. Crossover 562 extends between coil slots 405 and 413; and the wire is repeatedly passed rearwardly through the top of coil slot 413, between the rear ends of coil slots 413 and 406, forwardly through the top of coil slot 406, and between the front ends of coil slots 406 and 413. The front end of the resulting last coil of section AJ is denoted by the numeral 564. The free end 566 of the wire extends outwardly from the coil slot 406.

An end 568 of wire is set adjacent coil slot 407; and that wire is repeatedly passed rearwardly through the top of that coil slot, between the rear ends of coil slots 407 and 414, forwardly through the top of coil slot 414, and between the front ends of coil slots 414 and 407. The front end of the resulting first coil of section AK of the third phase winding is denoted by the numeral 570. Crossover 572 extends between coil slots 414 and 408; and the wire is repeatedly passed rearwardly through the top of coil slot 408, between the rear ends of coil slots 408 and 415, forwardly through the top of coil slot 415, and between the front ends of coil slots 415 and 408. The front end of the resulting second coil of section AK is denoted by the numeral 574. Crossover 576 extends between coil slot 415 and coil slot 409; and the wire is repeatedly passed rearwardly through the top of coil slot 409, between the rear ends of coil slots 409 and 416, forwardly through the bottom of coil slot 416, and between the front ends of coil slots 416 and 409. The front end of the resulting last coil of section AK is denoted by the numeral 578.

The end 580 of the wire extends outwardly from coil slot 416 and extends to coil slot 423; and the wire is repeatedly passed rearwardly through the top of coil slot 423, between the rear ends of coil slots 423 and 416, forwardly through the top of coil slot 416, and between the front ends of coil slots 416 and 423. The front end of the resulting first coil of section AL of the third phase winding is denoted by the numeral 582. Crossover 584 extends between coil slots 416 and 424; and the wire is repeatedly passed rearwardly through the top of coil slot 424, between the rear ends of coil slots 424 and 417, forwardly through the top of coil slot 417, and between the front ends of coil slots 417 and 424. The front end of the resulting second coil of section AL is denoted by the numeral 586. Crossover 588 extends from coil slot 417 to coil slot 425; and the wire is repeatedly passed rearwardly through the top of coil slot 425, between the rear ends of coil slots 425 and 418, forwardly through the top of coil slot 418, and between the front ends of coil slots 418 and 425. The front end of the resulting last coil of the third phase winding is denoted by the numeral 590. The free end 592 of the wire extends outwardly from coil slot 418.

At this time the various sections of the three phase windings are complete; and they provide physically symmetrical and electrical balanced windings. For example, each of the windings has four sections that have a total of twelve elongated sides in the tops of coil slots and have twelve elongated sides in the bottoms of coil slots. Further, the sections of each winding are distributed uniformly throughout the core of the dynamoelectric machine. In addition, the elongated sides of each section are dominantly spaced the same distance from the geometric center of the core.

The windings of FIG. 6 can be interconnected in various ways. As indicated in FIG. 7, those windings can be interconnected to form two star windings for low voltage operation. Thus, the ends 540, 566 and 592 can be suitably connected, as by solder, to form the center of one star winding; and the ends 462, 488 and 514 can be suitably connected, as by solder, to form the center of a second star winding. A conductor 594 connects leads 490 and 568, a conductor 596 connects leads 464 and 542, and a conductor 598 connects leads 438 and 516.

As indicated in FIG. 8, the windings of FIG. 6 can be interconnected to form a single star winding for high voltage operation. Thus, the ends 540, 566 and 592 can be suitably connected, as by solder, to form the center of a star winding. Sections AA, AB, AG and AH are connected in series to provide four poles of alternated polarity. Similarly, sections AC, AD, AI and AJ are connected in series to provide four poles of alternated polarity, and sections AE, AF, AK and AL are connected in series to provide four poles of alternated polarity.

In winding the stator of FIG. 6, the direction of winding was reversed between sections. This was done to avoid the need of cutting the wire and of soldering the various sections together. If, however, reversible winding machines are not available, or if the soldering of a number of connections is not unduly objectionable, the required alternated polarity can be obtained by cutting, and properly re-connecting, the leads of forwardly wound sections of the overall winding.

The cores shown and described herein have thirty-six coil slots, but this invention is not restricted to cores having that number of coil slots. Similarly, the windings shown and described herein provide four pole, dual voltage operation, but this invention is not restricted to such operation. The lap windings shown and described herein have three coils per pole, but the present invention can be used where there are more or fewer coils per pole. The windings shown and described herein are intended for use on three phase alternating current, but the present invention can be used on other polyphase alternating current. Too, the windings herein have been shown and described as being interconnected to form star windings, but they can also be interconnected to form delta windings. In addition, while sections AA and AB, AC and AD, AE and AF, AG and AH, AI and AJ, and AK and AL are wound as connected pairs of sections, they could be wound separately and connected at a later time. Furthermore, while the present invention is well adapted for use with coil winding machines, the present invention can be practiced where the windings are installed by hand. The electrical impedance of the various windings are the same whether the windings are interconnected for low voltage operation, for high voltage operation, or for increment starting. The applicability of the present invention to lap wound polyphase dynamoelectric machines is so wide that a further showing of applications would unduly prolong this description. Accordingly, whereas the drawing and accompanying description have shown and described several preferred embodiments of the present invention, it should be apparent to those skilled in the art that various changes may be made in the form of the present invention without affecting the scope thereof.

What I claim is:

1. A polyphase dynamoelectric machine that has a slotted core and that has a winding for each phase, each of said windings having a plurality of sections, the total number of sections of any one of said windings being an even integer, each of said windings having the sections thereof distributed uniformly around the periphery of said core, each of said windings having some of the turns thereof *with both sides thereof* disposed in the bottoms of coil slots in said core and having [the rest] *further* of the turns thereof *with both sides thereof* disposed in the tops of coil slots in said core *and having each of the remaining turns thereof with one side in the bottom of a coil slot in said core and with the opposite side in the top of a further coil slot in said core*, substantially all of the *sides of the* turns in any one section of any one winding being dominantly disposed at the same radial distance from the geometric center of said core, the total number of *sides of the* turns of any one winding in the tops of coil slots being substantially equal to the total number of *sides of the* turns of each other winding in the tops of coil slots, the total number of *sides of the* turns of any winding in the bottoms of coil slots being substantially equal to the total number of *sides of the* turns of each other winding in the bottoms of coil slots, whereby said windings are mechanically and electrically symmetrical, each of said sections of said windings having leads that project from said coil slots and that can be interconnected to fix the voltage to which said dynamoelectric machine can respond.

2. A polyphase dynamoelectric machine that has a slotted core and that has a winding for each phase, each of said windings having a plurality of sections, the total number of sections of any one of said windings being an even integer, each of said windings having the sections thereof distributed uniformly around the periphery of said core, each of said windings having some of the turns thereof *with both sides thereof* disposed in the bottoms of coil slots in said core and having [the rest] *further* of the turns thereof *with both sides thereof* disposed in the tops of coil slots in said core *and having each of the*

*remaining turns thereof with one side in the bottom of a coil slot in said core and with the opposite side in the top of a further coil slot in said core,* most of the turns in any one section of any one winding [being] *having the sides thereof* dominantly disposed at the same radial distance from the geometric center of said core, the total number of *sides of the* turns of any one winding in the tops of coil slots being substantially equal to the total number of *sides of the* turns of each other winding in the tops of coil slots, the total number of *sides of the* turns of any winding in the bottoms of coil slots being substantially equal to the total number of *sides of the* turns of each other winding in the bottoms of coil slots, whereby said windings are mechanically and electrically symmetrical.

3. A polyphase dynamoelectric machine that has a slotted core and that has a winding for each phase, each of said windings having a plurality of coils, *the plurality of coils of each winding being grouped to form a plurality of poles, each of said coils having one side thereof filling just one half of a coil slot and having the opposite side thereof filling just one half of a further coil slot, some of the coils of* each of said windings having [some] both of the opposite sides [of the coils] thereof disposed in the bottoms of coil slots in said core and *other of the coils of each of said windings* having *both of* the [rest of the] opposite sides [of the coils] thereof disposed in the tops of said slots in said core *and each of the rest of the coils of each of said windings having one side thereof in the bottom of a coil slot in said core while having the opposite side thereof in the top of a further coil slot in said core,* the total number of opposite sides of coils of any one winding in the tops of coil slots being substantially equal to the total number of opposite sides of coils of each other winding in the tops of coil slots, the total number of opposite sides of coils of any winding in the bottoms of coil slots being substantially equal to the total number of opposite sides of coils of each other winding in the bottoms of coil slots, *each winding having all of the coils thereof that are grouped to form one pole thereof with both sides thereof disposed wholly in the bottoms of coil slots and having all of the coils thereof with both sides thereof that are grouped to form a second pole thereof disposed dominantly in the bottoms of coil slots and having all of the coils thereof that are grouped to form a third pole thereof with the sides thereof disposed dominantly in the tops of coil slots and having all of the coils thereof that are grouped to form a fourth pole thereof with the sides thereof disposed wholly in the tops of coil slots,* most of the coils of said windings having the opposite sides thereof disposed at the same radial distance from the geometric center of said core, whereby said windings are electrically symmetrical.

4. A polyphase dynamoelectric machine that has a slotted core and that has a winding for each phase, each of said windings having the turns thereof arranged in groups of turns, *each group of turns having one side thereof filling just one half of a coil slot and having the opposite side thereof filling just one half of a further coil slot,* each of said windings having the grouped turns thereof distributed uniformly around the periphery of said core, each of said windings having some of the *said one sides and some of said opposite sides of the groups of* turns thereof disposed in the bottoms of coil slots in said core and having the rest of the *said one sides and the rest of said opposite sides of the groups of* turns thereof disposed in the tops of coil slots in said core, the total number of *sides of the groups of* turns of any one winding in the tops of coil slots being substantially equal to the number of *sides of the groups of* turns of each other winding in the tops of coil slots, the total number of *sides of the groups of* turns of any winding in the bottoms of coil slots being substantially equal to the total number of *sides of the groups* of turns of each other winding in the bottoms of coil slots, *some of the groups of turns of each winding defining a pole having all of the sides of the turns thereof wholly in the bottoms of coil slots, other of the groups of turns of each winding defining a pole having all of the sides of the turns thereof wholly in the tops of coil slots, still other groups of turns of each winding defining a pole having the greatest part of the sides of the turns thereof wholly in the tops of coil slots and having a lesser number of the sides of the turns thereof wholly in the bottoms of coil slots, yet other groups of turns of each winding defining a pole having the greatest part of the sides of the turns thereof wholly in the bottoms of coil slots and having a lesser number of the sides of the turns thereof wholly in the tops of coil slots, said some groups of turns of said windings being spaced apart and being disposed in the four quadrants of said core, said other groups of turns of said windings being spaced apart and being disposed in the four quadrants of said core,* most of the groups of turns of the windings having the *sides of the* turns thereof disposed at the same radial distance from the geometric center of said core, whereby said windings are mechanically and electrically symmetrical.

5. A polyphase dynamoelectric machine that has a slotted core and that has a winding for each phase, said windings being arranged as a plurality of coils and being positioned in the coil slots of said core, *each coil filling just one half of each of two coil slots,* a portion of the coils of each said winding being located wholly in the lower portions of said coil slots, other coils of each said winding being located wholly in the upper portions of said coil slots, and still other coils of each said winding having one opposite side thereof in the lower portions of said coil slots while having the other opposite side thereof in the upper portions of said coil slots, the number of coils of any one said winding in the upper portions of said coil slots being substantially equal to the number of coils of each of the other said windings in the upper portions of said coil slots, the number of coils of the said one winding in the lower portions of said coil slots being substantially equal to the number of coils of each of the other said windings in the lower portions of said coil slots, *the said coils that are located wholly in the lower portions of said coil slots being distributed substantially uniformly around the periphery of said core and being disposed in all of the quadrants of said core, the said coils that are located wholly in the upper portions of said coil slots being distributed substantially uniformly around the periphery of said core and being disposed in all of the quadrants of said core.*

6. A polyphase dynamoelectric machine that has a slotted core and that has a winding for each phase, said windings being arranged as a plurality of coils and being positioned in the coil slots of said core, *each coil filling just one half of each of two coil slots,* a portion of the coils of each said winding being located wholly in the lower portions of said coil slots, other coils of each said winding being located wholly in the upper portions of said coil slots, and still other coils of each said winding having one opposite side thereof in the lower portions of said coil slots while having the other opposite side thereof in the upper portions of said coil slots, the number of coils of any one said winding in the upper portions of said coil slots being substantially equal to the number of coils of each of the other said windings in the upper portions of said coil slots, the number of coils of the said one winding in the lower portions of said coil slots being substantially equal to the number of coils of each of the other said windings in the lower portions of said coil slots, *the said coils that are located wholly in the lower portions of said coil slots occupying the lower portions of substantially all of said coil slots, the said coils that are located wholly in the upper portions of said coil slots occupying the top portions of substantially all of said coil slots,* each of said windings having substantially the same number of said still other coils, whereby said windings are electrically symmetrical.

7. A polyphase dynamoelectric machine that has a slotted core and that has a winding for each phase, said windings being arranged as a plurality of coils and being positioned in the coil slots of said core, *each of coil filling just one half of each of two coil slots,* a portion of the coils of each said winding located wholly in the lower portions of said coil slots, other coils of each said winding being located wholly in the upper portions of said coil slots, and still other coils of each said winding having one opposite side thereof in the lower portions of said coil slots while having the other opposite side thereof in the upper portions of said coil slots, the number of coils of any one said winding in the upper portions of said coil slots being substantially equal to the number of coils of each of the other said windings in the upper portions of said coil slots, the number of coils of the said one winding in the lower portions of said coil slots being substantially equal to the number of coils of each of the other said windings in the lower portions of said coil slots, *the said coils that are located wholly in the* lower portions *of said coil slots occupying the lower portions of a majority of the total number of coil slots of said core, the said coils that are located wholly in the upper portions of said coil slots occupying the upper portions of a majority of the total number of coil slots of said core,* each of said windings having the [cores] *coils* thereof distributed substantially uniformly along the periphery of said core.

8. A polyphase dynamoelectric machine that has a slotted core and that has a winding for each phase, said windings being arranged as a plurality of coils and being positioned in the coil slots of said core, a portion of the coils of each said winding being located wholly in the lower portions of said coil slots, other coils of each said winding being located wholly in the upper portions of said coil slots, and still other coils of each said winding having one opposite side thereof in the lower portions of said coil slots while having the other opposite side thereof in the upper portions of said coil slots, the number of coils of any one said winding in the upper portions of said coil slots being substantially equal to the number of coils of each of the other said windings in the upper portions of said coil slots, the number of coils of the said one winding in the lower portions of said coil slots being substantially equal to the number of coils of each of the other said windings in the lower portions of said coil slots, said still other coils constituting a small fraction of the total number of coils of said windings.

9. A polyphase dynamoelectric machine that has a slotted core and that has a winding for each phase, said windings being positioned in the coil slots of said core, a portion of the coils of each said winding being located wholly in the lower portions of said coil slots, other coils of each said winding being located wholly in the upper portions of said coil slots, and still other coils of each said winding having one opposite side thereof in the lower portions of said coil slots while having the other opposite side thereof in the upper portions of said coil slots, *each coil filling just one half of each of two coil slots, the said coils that are located wholly in the lower portions of said coil slots occupying the lower portions of a majority of the total number of coil slots of said core, the said coils that are located wholly in the upper portions of said coil slots occupying the upper portions of a majority of the total number of coil slots of said core.*

10. A polyphase dynamoelectric machine that has a slotted core and that has a winding for each phase, said windings being positioned in the coil slots of said core, a portion of the coils of each said winding being located wholly in the lower portions of said coil slots, other coils of each said winding being located wholly in the upper portions of said coil slots, and still other coils of each said winding having one opposite side thereof in the lower portions of said coil slots while having the other opposite side thereof in the upper portions of said coil slots, the total number of coils of each said winding in the upper portions of said coil slots being substantially the same, the total number of coils of each said winding in the lower portions of said coil slots being substantially the same, *each coil filling just one half of each of two coil slots, the said coils that are located wholly in the lower portions of said coil slots being distributed substantially uniformly around the periphery of said core and spanning the greatest part of the periphery of said core, the said coils that are located wholly in the upper portions of said coil slots being distributed substantially uniformly around the periphery of said core.*

11. A polyphase dynamoelectric machine that has a slotted core and that has a winding for each phase, said windings being positioned in the coil slots of said core, a portion of the coils of each said winding being located wholly in the lower portions of said coil slots, other coils of each said winding being located wholly in the upper portions of said coil slots, and still other coils of each said winding having one opposite side thereof in the lower portions of said coil slots while having the other opposite side thereof in the upper portions of said coil slots, *each coil filling just one half of each of two coil slots,* the total number of coils of each said winding in the upper portions of said coil slots being substantially the same, the total number of coils of each said winding in the lower portions of said coil slots being substantially the same, and the total number of said still other coils of each said winding being substantially the same, *each winding having the coils thereof grouped to define a plurality of poles, one pole of each winding being defined by coils that are located wholly in the lower portions of coil slots, one pole of each winding being defined by coils that are dominantly located in the lower portions of coil slots, one pole of each winding being defined by coils that are dominantly located in the upper portions of coil slots, one pole of each winding being defined by coils that are located wholly in the upper portions of coil slots.*

12. A polyphase dynamoelectric machine that has a slotted core and that has a winding for each phase, said windings being positioned in the coil slots of said core, said windings constituting a pyramidal-lap winding for said dynamoelectric machine, each of said windings defining a plurality of pyramidal-wound poles, said windings being shifted in phase and being lapped, each of said windings having some coils thereof wholly located in the upper portions of the coil slots of said core and having other coils thereof located wholly in the lower portions of said coil slots, *each coil filling just one half of each of two coil slots, the said coils that are located wholly in the lower portions of said coil slots occupying the lower portions of a majority of the total number of coil slots of said core, the said coils that are located wholly in the upper portions of said coil slots occupying the upper portions of a majority of the total number of coil slots of said core.*

13. A polyphase dynamoelectric machine that has a slotted core and that has a winding for each phase, said windings being positioned in the coil slots of said core, said windings constituting a pyramidal-lap winding for said dynamoelectric machine, each of said windings defining a plurality of pyramidal-wound poles, said windings being shifted in phase and being lapped, each of said windings having some coils thereof wholly located in the upper portions of the coil slots of said core and having other coils thereof located wholly in the lower portions of said coil slots, *each coil filling just one half of each of two coil slots, the said coils that are located wholly in the lower portions of said coil slots being distributed substantially uniformly around the periphery of said core*

*and spanning the greatest part of the periphery of said core, the said coils that are located wholly in the upper portions of said coil slots being distributed substantially uniformly around the periphery of said core and spanning the greatest part of the periphery of said core,* the number of said some coils of each winding being substantially equal to the number of said other coils of each winding.

14. The polyphase dynamoelectric machine that has a slotted core and that has a winding for each phase, said windings being positioned in the coil slots of said core, a portion of the coils of each said winding being located wholly in the lower portions of said coil slots, other coils of each said winding being located wholly in the upper portions of said coil slots, and still other coils of each said winding having one opposite side thereof in the lower portions of said coil slots while having the other opposite side thereof in the upper portions of said coil slots, said windings defining pyramidal wound poles and being lapped to form a pyramidal-lap winding for said dynamoelectric machine, said windings having substantially the same impedance, *each coil filling just one half of each of two coil slots, the said coils that are located wholly in the lower portions of said coil slots being distributed substantially uniformly around the periphery of said core and occupying the lower portions of a majority of the total number of coil slots of said core, the said coils that are located wholly in the upper portions of said coil slots being distributed substantially uniformly around the periphery of said core and occupying the upper portions of a majority of the total number of coil slots of said core.*

15. A polyphase dynamoelectric machine that has a slotted core and that has a winding for each phase, said windings being positioned in the coil slots of said core, a portion of the coils of each said winding being located wholly in the lower portions of said coil slots, other coils of each said winding being located wholly in the upper portions of said coil slots, and still other coils of each said winding having one opposite side thereof in the lower portions of said coil slots while having the other opposite side thereof in the upper portions of said coil slots, said windings being modified lap windings of substantially equal impedance, the number of said still other coils being substantially equal for each of said windings.

16. The method of forming the winding of a polyphase dynamoelectric machine that comprises arranging the turns of each phase winding in groups of turns *wherein each group of turns fills just one half of two coil slots of said dynamoelectric machine,* disposing a number of the groups of turns of each *phase* winding wholly in the lower portions of the coil slots of said dynamoelectric machine *and thereby filling the lower portions of a majority of the total number of coil slots of said core, subsequently* disposing other groups of turns of each *phase* winding wholly in the upper portions of said coil slots *and thereby filling the upper portions of a majority of the total number of coil slots of said core,* and disposing still other groups of turns with one opposite side thereof in the upper portions of said coil slots and with the other opposite side thereof in the lower portions of said coil slots *during the disposing of said number of groups of turns and said other groups of turns in said lower portions and in said upper portions, respectively, of said coil slots.*

17. The method of forming the winding of a polyphase dynamoelectric machine that comprises arranging the turns of each phase winding in groups of turns *wherein each group of turns fills just one half of two coil slots of said dynamoelectric machine,* disposing a number of the groups of turns of each *phase* winding wholly in the lower portions of the coil slots of said dynamoelectric machine *and disposing said number of groups of turns so they are distributed substantially uniformly around the periphery of the core of said dynamoelectric machine and span the greatest part of the periphery of said core, subsequently* disposing other groups of turns of each *phase* winding wholly in the upper portions of said coil slots, *and disposing said other groups of turns so they are distributed substantially uniformly around the periphery of the core of said dynamoelectric machine and span the greatest part of the periphery of said core,* and disposing still other groups of turns with one opposite side thereof in the upper portions of said coil slots and with the other opposite side thereof in the lower portions of said coil slots *during the disposing of said number of groups of turns and said other groups of turns in said lower portions and in said upper portions, respectively, of said coil slots,* the number of groups of turns of each *phase* winding disposed wholly in the upper portions of said coil slots being substantially the same, the number of groups of turns of each *phase* winding disposed wholly in the lower portions of said coil slots being substantially the same.

*18. The method of forming the winding of a polyphase dynamoelectric machine that comprises arranging the turns of each phase winding in groups of turns wherein each group of turns fills just one half of two coil slots of said dynamoelectric machine, disposing a number of the groups of turns of each phase winding wholly in the lower portions of the coil slots of said dynamoelectric machine and thereby filling the lower portions of a majority of the total number of coil slots of said core and disposing said number of groups of turns so they span the greatest part of the core of said dynamoelectric machine, subsequently disposing other groups of turns of each phase winding in the upper portions of said coil slots and thereby filling the upper portions of a majority of the total number of coil slots of said core and disposing said other groups of turns so they span the greatest part of said core of said dynamoelectric machine, and disposing still other groups of turns with one opposite side thereof in the upper portions of said coil slots and with the other opposite side thereof in the lower portions of said coil slots during the disposing of said number of groups of turns and said other groups of turns in said lower portions and in said upper portions, respectively, of said coil slots.*

*19. A polyphase dynamoelectric machine that has a slotted core and that has a winding for each phase, each of said windings having the turns thereof arranged in groups of turns having one side thereof, each group of turns filling just one half of a coil slot and having the opposite side thereof filling just one half of a further coil slot, each of said windings having the grouped turns thereof distributed uniformly around the periphery of said core, each of said windings having some of the said one sides and some of said opposite sides of the groups of turns thereof disposed in the bottoms of coil slots in said core and having the rest of the said one sides and the rest of said opposite sides of the groups of turns thereof disposed in the tops of coil slots in said core, the total number of sides of the groups of turns of any one winding in the tops of coil slots being substantially equal to the total number of sides of the groups of turns of each other winding in the tops of coil slots, the total number of sides of the groups of turns of any winding in the bottoms of coil slots being substantially equal to the total number of sides of the groups of turns of each other winding in the bottoms of coil slots, some of the groups of turns having all of the sides of the turns thereof wholly in the bottoms of coil slots, other of the groups of turns having all of the sides of the turns thereof wholly in the tops of said coil slots, said some groups of turns spanning the greatest part of the periphery of said core, said other groups of turns also spanning the greatest part of the periphery of said core, most of the groups of turns of the windings having the sides of the turns thereof disposed at the same radial distance from the geometric center of said core, whereby said windings are mechanically and electrically symmetrical.*

*20. A polyphase dynamoelectric machine that has a slotted core and that has a winding for each phase, said*

*windings being positioned in the coil slots of said core, a portion of the coils of each said winding being located wholly in the lower portions of said coil slots, other coils of each said winding being located wholly in the upper portions of said coil slots, and still other coils of each said winding having one opposite side thereof in the lower portions of said coil slots while having the other opposite side thereof in the upper portions of said coil slots, some of said coil slots having sides of coils of one of said windings disposed in the lower portions thereof and having sides of coils of another of said windings disposed in the upper portions thereof, other of said coil slots having sides of coils of said one winding disposed in the upper portions thereof and having sides of coils of said other winding disposed in the lower portions thereof, the number of said some coil slots equalling the number of said other coil slots.*

No references cited.